(12) United States Patent
Terwilliger

(10) Patent No.: US 11,024,894 B2
(45) Date of Patent: Jun. 1, 2021

(54) COOLING ARCHITECTURE FOR A VEHICLE

(71) Applicant: United Technologies Corporation, Farmington, CT (US)

(72) Inventor: Neil Terwilliger, Meriden, CT (US)

(73) Assignee: Raytheon Technologies Corporation, Farmington, CT (US)

(*) Notice: Subject to any disclaimer, the term of this patent is extended or adjusted under 35 U.S.C. 154(b) by 198 days.

(21) Appl. No.: 15/971,295

(22) Filed: May 4, 2018

(65) Prior Publication Data
US 2019/0341659 A1 Nov. 7, 2019

(51) Int. Cl.
*H01M 10/44* (2006.01)
*H01M 10/613* (2014.01)
*H01M 10/625* (2014.01)
*H01M 10/656* (2014.01)

(52) U.S. Cl.
CPC ....... *H01M 10/443* (2013.01); *H01M 10/613* (2015.04); *H01M 10/625* (2015.04); *H01M 10/656* (2015.04); *H01M 2220/20* (2013.01)

(58) Field of Classification Search
CPC ............. H01M 10/443; H01M 10/656; H01M 10/625; H01M 10/613; H01M 2220/20; H02J 7/0029; H02J 7/0091; B60L 58/26; B60L 2240/545
See application file for complete search history.

(56) References Cited

U.S. PATENT DOCUMENTS

| 8,587,253 | B2 | 11/2013 | Dyer et al. |
| 9,233,618 | B2 | 1/2016 | Dyer et al. |
| 9,786,961 | B2 | 10/2017 | Dyer et al. |
| 2007/0209383 | A1 | 9/2007 | Hutton |
| 2013/0029193 | A1* | 1/2013 | Dyer ............... H01M 10/486 429/62 |

(Continued)

FOREIGN PATENT DOCUMENTS

| EP | 2985901 A1 | 2/2016 |
| EP | 3017990 A1 | 5/2016 |

OTHER PUBLICATIONS

European Search Report dated Jun. 28, 2019 for corresponding European Patent Application No. 19172394.9.

*Primary Examiner* — Drew A Dunn
*Assistant Examiner* — Sailesh Thapa
(74) *Attorney, Agent, or Firm* — Bachman & LaPointe, P.C.

(57) ABSTRACT

A method of recharging an energy storage system for a vehicle, the energy storage system operable in a charging mode and a discharging mode includes balancing a discharging mode waste power and a discharging mode removal power to independently maintain the energy storage system near a discharging design temperature during the discharging mode; receiving an off-board cooling flow into an on-board cooling architecture of the energy storage system during charging mode, wherein the on-board cooling architecture comprises a network of on-board passages proximate to at least portions of the energy storage system; and distributing the off-board cooling flow to maintain the energy storage system near a peak charging design temperature through a balance of a charging mode waste power and a charging mode removal power.

23 Claims, 3 Drawing Sheets

(56) References Cited

U.S. PATENT DOCUMENTS

| | | | |
|---|---|---|---|
| 2014/0292260 A1* | 10/2014 | Dyer | B60L 53/11 |
| | | | 320/107 |
| 2016/0023773 A1* | 1/2016 | Himmelmann | B64D 27/10 |
| | | | 60/778 |
| 2016/0134001 A1* | 5/2016 | Lindholm | H01M 10/66 |
| | | | 299/29 |
| 2017/0062885 A1 | 3/2017 | Cutright et al. | |
| 2017/0072813 A1 | 3/2017 | Martin et al. | |
| 2017/0292447 A1* | 10/2017 | Himmelmann | F01K 23/10 |
| 2017/0297431 A1* | 10/2017 | Epstein | F01P 3/20 |
| 2019/0036350 A1* | 1/2019 | Gleason | H01M 10/613 |

\* cited by examiner

|  |  | More Electric | | Hybrid | | All Electric | |
|---|---|---|---|---|---|---|---|
|  |  | Charge | Discharge | Charge | Discharge | Charge | Discharge |
| Energy Storage | kWh | 300 | 300 | 3000 | 3000 | 30000 | 30000 |
| Time To Charge Or Discharge | s | 1800 | 7200 | 1800 | 2000 | 1800 | 7200 |
| Charge Or Discharge Power | kW | 600 | 150 | 6000 | 5400 | 60000 | 15000 |
| Efficiency | % | 95 | 95 | 95 | 95 | 95 | 95 |
| Waste Power | kW | 30 | 7.5 | 300 | 270 | 3000 | 750 |

FIG. 2

COOLING ARCHITECTURE FOR A VEHICLE

BACKGROUND

The present disclosure relates generally to a vehicle with an electrical energy storage system and an associated on-board cooling architecture, where an operational method is provided to allow design improvements to the cooling architecture.

Power electronic based propulsion systems are utilized in a wide variety of applications including hybrid electric aircraft, vehicles, locomotives, spacecraft, and ship propulsion systems. Such systems may permit efficient propulsion but require complicated recharging systems. Heat management during recharging is more challenging with high capacity batteries because as battery capacity increases, passive cooling systems become less practical. In many applications, cooling during recharging can be handled by on-board cooling systems used during operation, but future aerospace applications will require rapid charging on the ground and weight-constrained on-board cooling architectures for use in flight.

SUMMARY

A method of recharging an energy storage system for a vehicle, the energy storage system operable in a charging mode and a discharging mode, the method according to one disclosed non-limiting embodiment of the present disclosure includes balancing a discharging mode waste power and a discharging mode removal power to independently maintain the energy storage system near a discharging design temperature during the discharging mode; receiving an off-board cooling flow into an on-board cooling architecture of the energy storage system during charging mode, wherein the on-board cooling architecture comprises a network of on-board passages proximate to at least portions of the energy storage system; and distributing the off-board cooling flow to maintain the energy storage system near a peak charging design temperature through a balance of a charging mode waste power and a charging mode removal power.

A further embodiment of any of the foregoing embodiments of the present disclosure includes that balancing the discharging mode waste power and the discharging mode removal power comprises sizing a heat exchanger for a discharging mode ambient temperature.

A further embodiment of any of the foregoing embodiments of the present disclosure includes that the peak charging design temperature is the maximum temperature at which the energy storage system operates when the charging mode waste power is at a maximum.

A further embodiment of any of the foregoing embodiments of the present disclosure includes that the peak charging design temperature equals the discharging design temperature.

A vehicle according to one disclosed non-limiting embodiment of the present disclosure includes an energy storage system configured to operate in both a charging mode and a discharging mode; and an on-board cooling architecture comprising a network of on-board passages proximate to at least a portion of the energy storage system, the on-board cooling architecture configured to maintain the energy storage system near a discharging design temperature through a balance of a discharging mode waste power and a discharging mode removal power during the discharging mode and receive an off-board cooling flow during the charging model to maintain the energy storage system near a peak charging design temperature through a balance of a charging mode waste power and a charging mode removal power.

A further embodiment of any of the foregoing embodiments of the present disclosure includes that the on-board cooling architecture is configured to maintain the energy storage system near a peak charging design temperature, and the charging mode waste power is greater than the discharging mode maximum removal power while the on-board cooling architecture uses the off-board cooling flow during charging.

A further embodiment of any of the foregoing embodiments of the present disclosure includes that the on-board cooling architecture is configured such that without the use of the off-board cooling flow, if a charging mode ambient temperature equals a discharging mode ambient temperature, then the charging mode removal power equals the discharging mode removal power.

A further embodiment of any of the foregoing embodiments of the present disclosure includes that the on-board cooling architecture is configured such that without the use of the off-board cooling flow, if a charging mode ambient temperature is greater than a discharging mode ambient temperature, and a charging mode ambient air density is greater than a discharging mode ambient air density, then the charging mode removal power is less than the discharging mode maximum removal power.

A further embodiment of any of the foregoing embodiments of the present disclosure includes that the on-board cooling architecture is configured such that with the use of the off-board cooling flow, if a charging mode ambient temperature is greater than a discharging mode ambient temperature, then the charging mode removal power is greater than the discharging mode maximum removal power.

A further embodiment of any of the foregoing embodiments of the present disclosure includes that the on-board cooling architecture is configured such that with the use of the off-board cooling flow, if a discharging mode time period is greater than a charging mode time period, then the charging mode waste power is greater than the discharging mode waste power, and the charging mode removal power is greater than the discharging mode removal power.

A further embodiment of any of the foregoing embodiments of the present disclosure includes that the on-board cooling architecture is configured to maintain the energy storage system near a discharging design temperature without the use of the off-board cooling flow.

A further embodiment of any of the foregoing embodiments of the present disclosure includes that the on-board cooling architecture is configured to balance the discharging mode waste power and the discharging mode removal power with a heat exchanger sized for a discharging mode ambient temperature and a discharging efficiency of the energy storage system.

A further embodiment of any of the foregoing embodiments of the present disclosure includes that the on-board cooling architecture is configured to balance the charging mode waste power and the charging mode removal power with a heat exchanger configured to receive the off-board cooling flow and sized for a charging efficiency of the energy storage system.

A further embodiment of any of the foregoing embodiments of the present disclosure includes that the peak charging design temperature is the maximum temperature that the energy storage system should operate when charging mode waste power is at a maximum.

A further embodiment of any of the foregoing embodiments of the present disclosure includes that the peak charging design temperature equals the discharging design temperature.

A further embodiment of any of the foregoing embodiments of the present disclosure includes that the on-board cooling architecture is configured to receive an off-board cooling flow, the on-board cooling architecture comprises a heat exchanger configured to maintain the energy storage system near a discharging design temperature without the off-board cooling flow and to maintain the energy storage system near a peak charging design temperature with the off-board cooling flow.

A further embodiment of any of the foregoing embodiments of the present disclosure includes that the on-board cooling architecture comprises a controller configured to adjust at least one of a coolant temperature and a coolant flow rate from at least one of an onboard heat exchanger and an offboard heat exchanger.

A vehicle according to one disclosed non-limiting embodiment of the present disclosure includes an energy storage system configured to operate in both a charging mode and a discharging mode; means for receiving an off-board cooling flow into the energy storage system during charging of the energy storage system such that the off-board cooling flow maintains the energy storage system near a peak charging design temperature through a balance of a charging mode waste power and a charging mode removal power.

A further embodiment of any of the foregoing embodiments of the present disclosure includes that the means for receiving an off-board cooling flow into the energy storage system comprises a heat exchanger configured to independently maintain the energy storage system near a discharging design temperature without the use of the off-board cooling flow, and to maintain the energy storage system near a peak charging design temperature with the use of the off-board cooling flow.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 is a table representing various example "hybrid-electric", "more electric" and "all electric" aircraft capacities and aircraft charging requirements.

DETAILED DESCRIPTION

Figure 1:
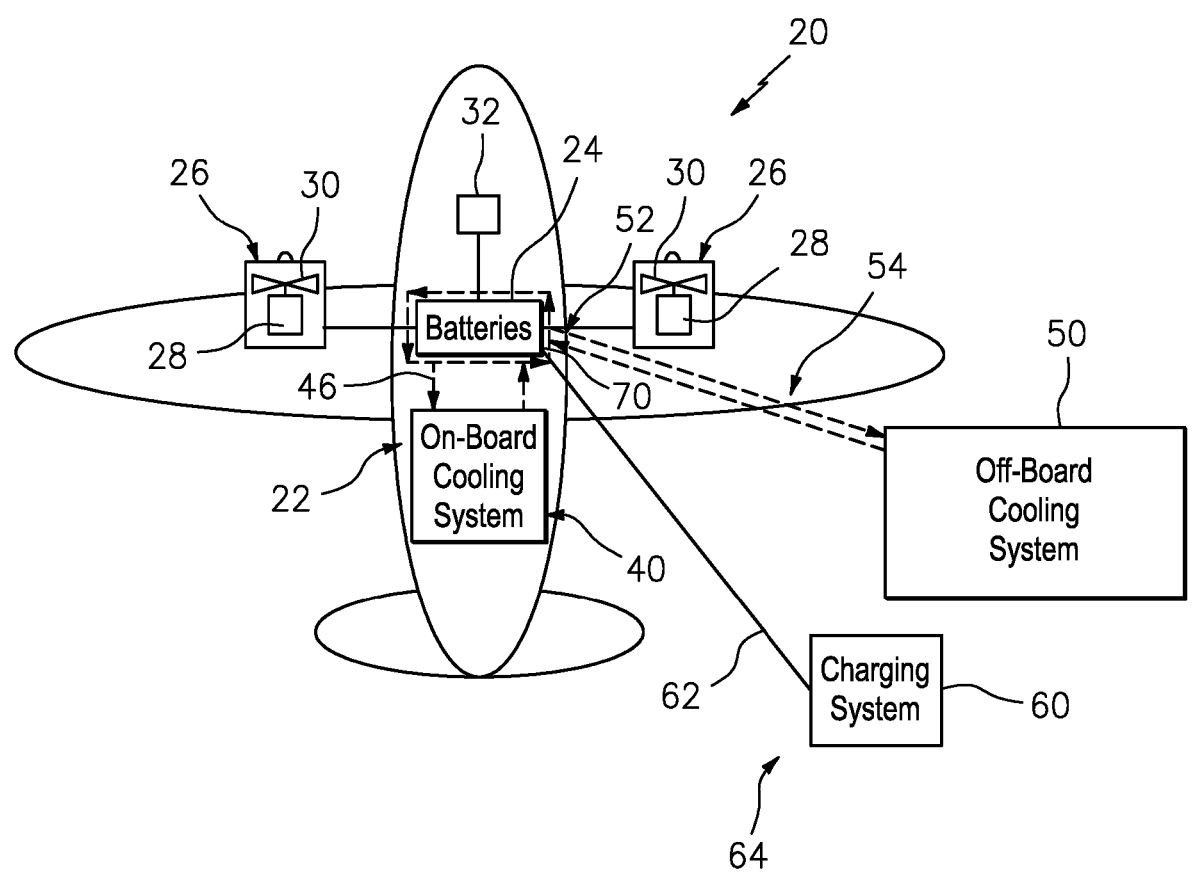
FIG. 1 illustrates an example hybrid-electric aircraft charging and cooling system.

FIG. 1 schematically illustrates an example hybrid-electric aircraft 20 with a hybrid-electric powertrain 22 having an energy storage system 24, e.g., battery packs, and one or more propulsors 26. Depending on the variant of hybrid-electric aircraft and the flight condition, thrust may be provided via relatively small gas turbine engines that are supplemented by electric motor boosted fans, propellers, or other propulsors. Although a hybrid-electric aircraft is illustrated in the disclosed embodiment, vehicles with different levels of electrification may alternatively benefit herefrom. An all-electric system utilizes all propulsive power from stored electricity, a hybrid electric system utilizes some propulsive power from stored electricity and a more electric system utilizes stored electricity used for non-propulsive purposes such as replacing engine offtakes.

The propulsors 26 may include a power generator 28 such as a gas turbine engine and an electric driven fan rotor system 30 for high static thrust conditions. Power for the electric driven fan rotor system 30 is provided through the hybrid-electric powertrain 22 by the energy storage system 24, e.g., battery packs on the order of 0.2 megawatt hours capacity and more specifically 0.2-30 megawatt hours capacity. In one embodiment of a hybrid architecture that can expand to include an all-electric architecture, the power generators 28 are sized for a particular flight condition such as cruise, quiet operation, etc. The power generator 28 is then supplemented by the electric driven fan rotor system 30 during other conditions for high static thrust conditions such as take-off, high climb rates, etc. Power may be delivered to the propulsors 26 through an electric distribution system 34 which sources energy from any combination of the energy storage system 24 and the power generator 28 as managed by a control system 32. All or most of the sub-systems such as the flight control system, landing gear, environmental control systems, anti-icing, fuel pumps, taxi motors, and lighting may be electrically powered.

The hybrid-electric aircraft 20 includes an on-board cooling architecture 40 to control the temperature of the energy storage system 24. The on-board cooling architecture 40 may include a network of on-board passages proximate to at least portions of the energy storage system 24. The on-board cooling architecture 40 may be a liquid-liquid system, liquid-air system, ram air system, or combinations thereof. The on-board cooling architecture 40 is generally sized to provide cooling capacity for an expected heat discharge during flight operations, quiet operation.

The hybrid-electric aircraft 20 with on-board cooling architecture 40 may benefit from having recharging operations cooled by an off-board cooling system 50 as recharging may be desired to be completed as rapidly as possible, which leads to increase in temperature control and cooling needs. If not dissipated, higher battery temperatures during recharging may cause significant reduction in battery life. In general, the off-board cooling becomes more compelling for highly weight constrained systems, typical of aircraft. From an economic standpoint, it may also be desirable to maintain the energy storage system 24 at a lower temperature during ground recharging compared to in flight discharging, as a relatively oversized cooling solution for recharging has no weight penalty, compared to discharging when part of the vehicle. In aerospace applications, the charge rate may be many times higher than the design discharge rate and the cooling environment may be more challenging due to a higher ambient temperature. The scale of the cooling required is significant enough that even saving a fraction of the weight of the on-board system justifies the added complexity of the off-board cooling system 50, as in the case where bulk electric energy is used for propulsive power in an all-electric or hybrid electric aircraft, where energy storage needs may range from 1-100 megawatt hours (FIG. 2).

The storage system 24 of the hybrid-electric aircraft 20 is recharged with electrical energy via a ground-based charger 60. The ground-based charger 60 connects to the hybrid-electric aircraft 20 through a charging connection 70 of a charging circuit 62 thus forming a charging system 64. The ground-based charger 60 may be a fixed location, cart, or other device which operates to charge the storage system 24 and detaches from the vehicle when charging is completed.

Delta temperature, the difference between battery temperature and ambient temperature, is a fundamental parameter that affects how much maximum removal power a heat exchanger has in an environment. Recharging (delta temperature is equal to 5 degrees F.) occurs at a significantly different delta temperature than discharging (delta temperature is equal to 95 degrees F.) as aircraft may need to be recharged in a hot environment on the ground but discharged at 35000 feet altitude. This delta temperature difference between charging and discharging may result in an economic benefit to aircraft designed to use the off-board cooling system 50 during recharging even when the charging waste power is less than the discharging waste power.

The off-board cooling system 50 connects to the hybrid-electric aircraft 20 to provide cooling of the energy storage system 24 while the aircraft 20 is being recharged. The off-board cooling system 50 may be a fixed location, cart, or other device either separate or integrated with the ground-based charger 60. The off-board cooling system 50 connects to the hybrid-electric aircraft 20 through a cooling system connection point 52 to provide a cooling circuit 54 with the on-board cooling architecture 40. The cooling system connection point 52 may be separate or integral with the charging connection 70. The charging circuit 62 may have multiple connection points 70 to the aircraft 20. The cooling circuit 54 may be distant or proximate to the charging circuit 62. Augmenting cooling through a cooling circuit 54 proximate to the charging circuit 62 that is recharging the energy storage system 24 has the advantage of controlling the temperature of the charging circuit as well as the energy storage system 24.

The off-board cooling system 50 operates to augment or replace the on-board cooling architecture 40 during recharging. The off-board cooling system 50 may include various cooling systems such as a liquid-to-liquid system, closed-loop dry system, closed-loop dry system with trim cooling, open-loop evaporative system, closed-loop evaporative system, chilled water system, or other system that augments the on-board cooling architecture 40 so that the energy storage system 24 may be relatively rapidly recharged to meet aircraft turnaround times or other efficiency metrics. In other words, heat management can be handled by on-board cooling architecture 40 during flight operations, but in the likely event that rapid recharging is desired on the ground, cooling during recharging is typically not sufficient with the on-board cooling architecture 40 that is designed to handle in flight cooling requirements.

The off-board cooling system 50 can be sized to handle the cooling requirement required by both the rapid recharging and also the decreased delta temperature encountered on the ground, while the highly weight-constrained on-board cooling architecture 40 can be designed sufficient only for the in-flight cooling requirements where discharge-related heat is relatively smaller and the delta temperature is greater.

The off-board cooling system 50 communicates with the energy storage system 24 via the cooling circuit 54 to communicate a coolant through the on-board cooling architecture 40 that essentially increases the capacity thereof and augments the on-board coolant loop 46 with the externally-cooled coolant during charging. This will allow the on-board cooling architecture 40 to be sized at the relatively lower discharge rate of flight while achieving the higher recharge rate on the ground. Alternatively, the on-board cooling architecture 40 may not need to be utilized during recharging.

With reference to FIG. 2, an example hybrid electric aircraft may operate on a slightly higher waste power between charge and discharge, but the difference is about 30 kW and the higher ambient temperature during charging is a more challenging environment for heat exchanger design. In contrast, the example more electric aircraft generates four times more waste power during charging compared to discharging but is also challenged by the relatively small delta temperature of the charging environment.

Usage of the off-board cooling system 50 during recharging facilitates installation of several advantageous types of on-board cooling architectures 40. For example, on-board architectures that rely on a temperature drop to ambient to reject heat rather than an energy-intensive refrigeration cycle would be impractical to be relied upon for heat rejection during charging when delta temperature is small. In another example, the on-board cooling architecture 40 may reject waste heat into a fan stream for thrust recovery. This would require that the propulsors 26 are moving air and thus would be impractical during charging when propulsor use is not otherwise needed. In another example, a heat exchanger in the on-board cooling system 40 could be designed to use ram air which would be unavailable when a stationary aircraft is charging. In yet another example, the on-board system may use coolant that needs to be frequently replaced, such as with some cryogenic methods. In this case the frequent connection to an off-board cooling system 50 would additionally replenish and renew the coolant.

Figure 3:
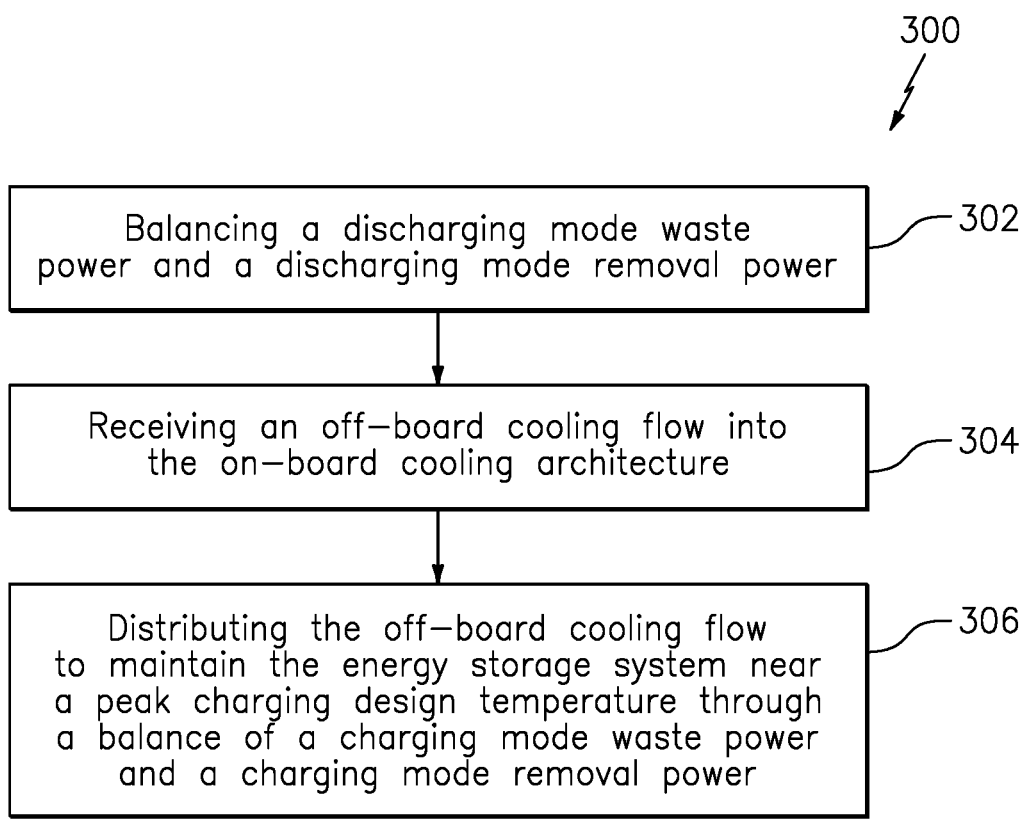
FIG. 3 is a block diagram of a method of recharging the energy storage system.

With reference to FIG. 3, a method 300 of recharging the energy storage system 24 initially includes balancing (step 302) a discharging mode removal power to be equal to a discharging mode waste power to maintain the energy storage system 24 near a discharging design temperature during the discharging mode. Waste power is the rate of heat generation by the energy storage system 24 during charging or discharging. Removal power is the rate of heat being rejected into the environment by the cooling system, either by the on-board cooling system 40 in the case of discharging or the off-board cooling system 50 during charging. As defined herein, removal power is cooling quantity, which is balanced to waste power, but maximum removal power relates to cooling capability, where the maximum removal power of a cooling system in an environment is defined as the highest waste power that is able to be balanced by the given cooling system in the given environment.

In one embodiment, balancing the discharging mode waste power and the discharging mode removal power may include, for example, selecting an on-board cooling architecture 40 at a size capable of removal power equal to waste power in the discharging environment. The removal power of the on-board cooling system 40 is dictated by the heat exchanger design, coolant properties, flow rates, ambient properties, flow rates, and in the case of a refrigeration cycle, the power input. Waste power is determined by discharging power required and battery efficiency as in FIG. 2. Additionally, balancing discharging mode waste power and discharging mode removal power (step 302) may include a control scheme and control devices such as a coolant flow regulator or cooling air valve on the heat exchanger, a means of controlling the power input to the on-board cooling system for pumping coolant or airflow, and temperature sensors proximate to the energy storage system 24 or coolant loop 46 which may be used as input to the control to adjust the control devices to maintain a design discharging temperature. The discharge power of the energy storage system 24 may also be an input to the cooling system control.

Next, during the charging mode, the off-board cooling flow is received (step 304) from the off-board cooling system 50 into the on-board cooling architecture 40 of the energy storage system 24.

Next, the off-board cooling flow is distributed (step 306) to maintain the energy storage system 24 near a peak charging design temperature through a balance of a charging mode waste power and a charging mode removal power. Cooling flow distribution may be a cycle of cooling flow into and out of on-board coolant loop 46 achieved by a pump in the off-board cooling system 50, or it may involve adjusting cooling flow rates individually into to certain sections of on-board coolant loop 46 via a system of valves, sensors, and control. The peak charging design temperature is the maximum temperature at which the energy storage system 24 operates when the charging mode waste power is at a maximum. This balance may be affected by, for example, varying the coolant flow rate, varying cold side flow across the heat exchanger with a fan or valve, varying the power input into a refrigeration cycle, or other affecter. Changing the balance may be effectuated by, for example, measuring a battery temperature or battery exit coolant temperature and driving each to a desired target by adjusting the affecters. The off-board cooling flow may replace or augment the cooling provided by the on-board cooling architecture 40. There may be a control signal sent from the vehicle 20 to the off-board cooling system 50 to effectuate waste power and removal power balance. In one example, the temperature of the energy storage system 24 may be maintained within +/−20 degrees F. of the peak charging design temperature. More specifically, the temperature of the energy storage system 24 may be maintained within +/−10 degrees F. and even +/−5 degrees F. of the peak charging design temperature.

In one example without the use of the off-board cooling flow, if a charging mode ambient temperature equals a discharging mode ambient temperature, then the charging mode removal power equals the discharging mode removal power. Further, if a discharging mode time period is greater than a charging mode time period, then the charging mode waste power is greater than the discharging mode waste power, and the charging mode removal power is greater than the discharging mode removal power. In contrast, without the use of the off-board cooling flow, if a charging mode ambient temperature is greater than a discharging mode ambient temperature, and a charging mode ambient air density is greater than a discharging mode ambient air density, then the charging mode removal power is less than the discharging mode removal power.

Although the different non-limiting embodiments have specific illustrated components, the embodiments need not be limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method of recharging an energy storage system for a vehicle, the energy storage system operable in a charging mode and a discharging mode, the method comprising:
    balancing a discharging mode waste power and a discharging mode removal power to independently maintain the energy storage system near a discharging design temperature during the discharging mode via an on-board cooling architecture;
    receiving an off-board cooling flow from an off-board cooling system into the on-board cooling architecture of the energy storage system during charging mode, the on-board cooling architecture is configured to receive the off-board cooling flow wherein the on-board cooling architecture comprises a network of on-board passages proximate to at least portions of the energy storage system, the off-board cooling flow communicates with the energy storage system via the network of on-board passages; and
    distributing the off-board cooling flow to maintain the energy storage system near a charging design temperature through a balance of a charging mode waste power and a charging mode removal power.

2. The method as recited in claim 1, wherein balancing the discharging mode waste power and the discharging mode removal power comprises sizing a heat exchanger for a discharging mode ambient temperature.

3. The method as recited in claim 1, wherein a peak charging design temperature is the maximum temperature at which the energy storage system operates when the charging mode waste power is at a maximum.

4. The method as recited in claim 1, wherein the on-board cooling architecture is configured to receive the off-board cooling flow to replenish and renew the coolant.

5. The method as recited in claim 1, wherein the on-board cooling architecture rejects waste heat into a fan stream of a hybrid electric aircraft for thrust recovery.

6. A vehicle, comprising:
    an energy storage system configured to operate in both a charging mode and a discharging mode;
    an on-board cooling architecture configured to receive an off-board cooling flow and in fluid communication with the energy storage system during the charging mode of the energy storage system such that the off-board cooling flow maintains the energy storage system near a charging design temperature through a balance of a charging mode waste power and a charging mode removal power, the on-board cooling architecture configured to maintain the energy storage system near a discharging design temperature during the discharging mode without the use of the off-board cooling flow.

7. The vehicle as recited in claim 6, wherein the on-board cooling architecture is configured to maintain the energy storage system near a peak charging design temperature, and the charging mode waste power is greater than the discharging mode maximum removal power while the on-board cooling architecture uses the off-board cooling flow during charging.

8. The vehicle as recited in claim 7, wherein the on-board cooling architecture is configured such that without the use of the off-board cooling flow, if a charging mode ambient temperature equals a discharging mode ambient temperature, then the charging mode removal power equals the discharging mode removal power.

9. The vehicle as recited in claim 8, wherein the on-board cooling architecture is configured such that without the use of the off-board cooling flow, if a charging mode ambient temperature is greater than a discharging mode ambient temperature, and a charging mode ambient air density is greater than a discharging mode ambient air density, then the charging mode removal power is less than the discharging mode maximum removal power.

10. The vehicle as recited in claim 7, wherein the on-board cooling architecture is configured such that with the use of the off-board cooling flow, if a charging mode ambient temperature is greater than a discharging mode ambient temperature, then the charging mode removal power is greater than the discharging mode maximum removal power.

11. The vehicle as recited in claim 10, wherein the on-board cooling architecture is configured such that with the use of the off-board cooling flow, if a discharging mode time period is greater than a charging mode time period, then the charging mode waste power is greater than the discharging mode waste power, and the charging mode removal power is greater than the discharging mode removal power.

12. The vehicle as recited in claim 6, wherein the on-board cooling architecture is configured to maintain the energy storage system near a discharging design temperature without the use of the off-board cooling flow.

13. The vehicle as recited in claim 6, wherein the on-board cooling architecture is configured to balance the discharging mode waste power and the discharging mode removal power with a heat exchanger sized for a discharging mode ambient temperature and a discharging efficiency of the energy storage system.

14. The vehicle as recited in claim 6, wherein the on-board cooling architecture is configured to balance the charging mode waste power and the charging mode removal power with a heat exchanger configured to receive the off-board cooling flow and sized for a charging efficiency of the energy storage system.

15. The vehicle as recited in claim 6, wherein a peak charging design temperature is the maximum temperature that the energy storage system should operate when charging mode waste power is at a maximum.

16. The vehicle as recited in claim 6, wherein a peak charging design temperature equals the discharging design temperature.

17. The vehicle as recited in claim 6, wherein the on-board cooling architecture is configured to receive an off-board cooling flow, the on-board cooling architecture comprises a heat exchanger configured to maintain the energy storage system near a discharging design temperature without the off-board cooling flow and to maintain the energy storage system near a peak charging design temperature with the off-board cooling flow.

18. The vehicle as recited in claim 17, wherein the on-board cooling architecture comprises a controller configured to adjust at least one of a coolant temperature and a coolant flow rate from an onboard heat exchanger and an offboard heat exchanger.

19. The vehicle as recited in claim 6, wherein the on-board cooling architecture is configured to receive the off-board cooling flow to replenish and renew the coolant.

20. The vehicle as recited in claim 6, wherein the on-board cooling architecture rejects waste heat into a fan stream of a hybrid electric aircraft for thrust recovery.

21. A hybrid electric aircraft, comprising:
an energy storage system configured to operate in both a charging mode and a discharging mode;
means for receiving an off-board cooling flow into an on-board cooling architecture in fluid communication with the energy storage system during the charging mode of the energy storage system such that the off-board cooling flow maintains the energy storage system near a charging design temperature through a balance of a charging mode waste power and a charging mode removal power, the on-board cooling architecture configured to maintain the energy storage system near a discharging design temperature during the discharging mode without the use of the off-board cooling flow.

22. The hybrid electric aircraft as recited in claim 21, wherein the means for receiving an off-board cooling flow into the energy storage system comprises a heat exchanger configured to independently maintain the energy storage system near a discharging design temperature without the use of the off-board cooling flow, and to maintain the energy storage system near a peak charging design temperature with the use of the off-board cooling flow.

23. The vehicle as recited in claim 21, wherein the on-board cooling architecture is configured to receive the off-board cooling flow to replenish and renew the coolant.

\* \* \* \* \*